(12) United States Patent
Nabeiro

(10) Patent No.: US 10,752,482 B2
(45) Date of Patent: Aug. 25, 2020

(54) MACHINE AND PROCESS FOR PREPARING BEVERAGES BASED UPON BEVERAGE CONCENTRATE CARTRIDGES

(71) Applicant: NOVADELTA—COMÉRCIO E INDÚSTRIA DE CAFÉS S.A., Lisbon (PT)

(72) Inventor: Rui Miguel Nabeiro, Campo Maior (PT)

(73) Assignee: NOVADELTA—COMÉRCIO E INDÚSTRIA DE CAFÉS S.A., Lisbon (PT)

( * ) Notice: Subject to any disclaimer, the term of this patent is extended or adjusted under 35 U.S.C. 154(b) by 0 days.

(21) Appl. No.: 16/091,645

(22) PCT Filed: Apr. 6, 2017

(86) PCT No.: PCT/PT2017/050009
§ 371 (c)(1),
(2) Date: Oct. 5, 2018

(87) PCT Pub. No.: WO2017/176138
PCT Pub. Date: Oct. 12, 2017

(65) Prior Publication Data
US 2019/0152755 A1    May 23, 2019

(30) Foreign Application Priority Data
Apr. 7, 2016    (PT) .......................................... 109305

(51) Int. Cl.
*B67D 1/00*    (2006.01)
*A47J 31/40*    (2006.01)
*A47J 31/41*    (2006.01)

(52) U.S. Cl.
CPC .......... *B67D 1/0022* (2013.01); *A47J 31/401* (2013.01); *A47J 31/402* (2013.01); *A47J 31/41* (2013.01);
(Continued)

(58) Field of Classification Search
CPC .... B67D 1/002; B67D 1/0051; B67D 1/0052; B67D 1/10078; B67D 1/0024; A47J 31/41; A47J 31/401; A47J 31/402
See application file for complete search history.

(56) References Cited

U.S. PATENT DOCUMENTS 5,172,831 A    12/1992    Burrows
5,234,134 A    8/1993    Raab et al.
(Continued)

FOREIGN PATENT DOCUMENTS

DE    20 2014 005604 U1    9/2014
WO    2005/079361 A2    9/2005

OTHER PUBLICATIONS

Machine Translation of DE 202014005604 U1 from espacenet.com.*
(Continued)

*Primary Examiner* — Jeremy Carroll
(74) *Attorney, Agent, or Firm* — Sughrue Mion, PLLC (57) ABSTRACT

The present invention refers to a machine (1) for preparing beverages and presenting a plurality of beverage concentrate cartridges (2) provided so that can collect a respective beverage concentrate (3), and a concentrate discharge device (4) adapted so that can interact with each one of said beverage concentrate cartridges (2), without using fluid connections between the exit parts (22) of said beverage concentrate cartridges (2) and a service disposition (11) of the machine that comprises a discharge zone where there can be placed a beverage recipient.

(Continued)

The present invention further refers to a process for preparing beverages based upon a machine (1) for preparing beverages of the type of the present invention.

19 Claims, 5 Drawing Sheets

(52) U.S. Cl.
CPC ......... *B67D 1/0051* (2013.01); *B67D 1/0052* (2013.01); *B67D 1/0078* (2013.01)

(56) References Cited

U.S. PATENT DOCUMENTS

| | | | |
|---|---|---|---|
| 2008/0023488 A1* | 1/2008 | Guerrero | B67D 1/0001 222/129.4 |
| 2009/0223375 A1* | 9/2009 | Verbeek | B67D 1/0021 99/287 |
| 2012/0103197 A1 | 5/2012 | Chase et al. | |

OTHER PUBLICATIONS

Written Opinion for PCT/PT2017/050009, dated Aug. 2, 2017.
International Search Report for PCT/PT2017/050009, dated Aug. 2, 2017.

\* cited by examiner

MACHINE AND PROCESS FOR PREPARING BEVERAGES BASED UPON BEVERAGE CONCENTRATE CARTRIDGES

CROSS REFERENCE TO RELATED APPLICATIONS

This Application is a National Stage of International Application No. PCT/PT2017/050009 filed Apr. 6, 2017, claiming priority based on Portugal Patent Application No. 109305 filed Apr. 7, 2016.

FIELD OF THE INVENTION

The present invention refers to the field of machines for preparing beverages based upon cartridges of a beverage concentrate.

The present invention further refers to a process for preparing beverages by means of a machine of the type of the present invention.

BACKGROUND OF THE INVENTION

The preparation of beverages, such as for example coffee, based upon the mixture of at least one beverage concentrate and at least one diluent thereof, for example water, presents several advantages. In this respect, there are known machines for preparing beverages presenting a plurality of beverage concentrate cartridges adapted for supplying a respective beverage concentrate in a process of mixture with a respective diluent.

The documents EP 2114770 B1 and EP 2114770 B1 disclose a machine of the same type, presenting a plurality of beverage concentrate cartridges corresponding to respectively different types of beverage, and whereby each one of the beverage concentrate cartridges is provided in fluid connection, by means of respective fluid conduits, with a concentrate discharge device. This type of construction results complex. Moreover, the use of mixture chambers suggests greater maintenance requirements in view of hygiene requirements, and one mixture chamber for each type of beverage, so as to prevent flavour contamination.

The document WO 2005/054116 A1 discloses another machine for preparing beverages of the same type, whereby the injectors of concentrate and diluent are provided so that the mixture is formed as a result of the collision of the respective fluxes.

The document US 2012/0103197 A1 discloses a machine for preparing beverages do the same type, including an embodiment that comprises a mobile carrousel-like support adapted for supporting a plurality of containers of different types of fluid ingredients. As fluid displacement means, said document proposes the use of a pump for pumping the fluid ingredient out of each cartridge. A reference is made to an actuation device that can be moved upwards and downwards by a positioner so as to enable that said carrousel is rotated. This actuation device does not intervene in the process of discharge of fluid ingredient out of said containers.

Moreover, is disclosed a discharge conduit provided in the proximity, without engaging with the cartridges, and configured as relatively narrow, whereby said discharge conduit is common to the discharge of different types of fluid ingredient, so that the preparation of a type of beverage can leave vestiges thereupon and, therefore, influence organoleptic properties of a different type of beverage being prepared afterwards.

GENERAL DESCRIPTION OF THE INVENTION

The objective of the present invention is to provide a machine for preparing beverages presenting a plurality of cartridges of beverage concentrate, in particular cartridges of concentrate corresponding to different types of beverage, and that provides greater construction simplicity, a more compact construction and providing greater operation reliability.

This objective is solved according to the present invention by means of a machine for preparing beverages according to claim 1.

In particular, the machine according to the present invention is adapted so that comprises a concentrate discharge device adapted so that can interact with each one of a plurality of beverage concentrate cartridges, by means of a forward movement of said concentrate discharge device along a direction parallel to the prevailing discharge direction, thereby actuating an opening that provides a discharge of said beverage concentrate, and, in the return backward movement of the concentrate discharge device, driving the closure of the discharge part of a respective beverage concentrate cartridge.

Another objective of the present invention is to provide a process for preparing beverages by means of a machine for preparing beverages adapted for using a plurality of beverage concentrate cartridges.

This objective is solved according to the present invention by means of a process according to claim 15.

DESCRIPTION OF THE FIGURES

The invention shall be hereinafter explained in greater detail based upon preferred embodiments and the attached Figures.

The Figures show, in simplified schematic representations.

DESCRIPTION OF PREFERRED EMBODIMENTS OF THE INVENTION

Figure 1:
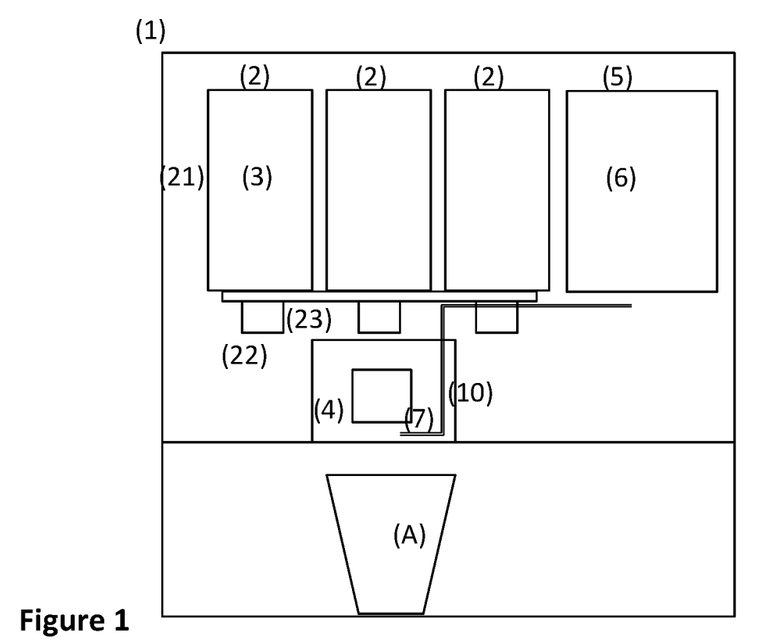
FIG. 1: front view of main functional components of a first embodiment of a machine (1) for preparing beverages according to the present invention, at a non actuated discharge position of beverage concentrate (3) into a recipient (A)
Figure 2:
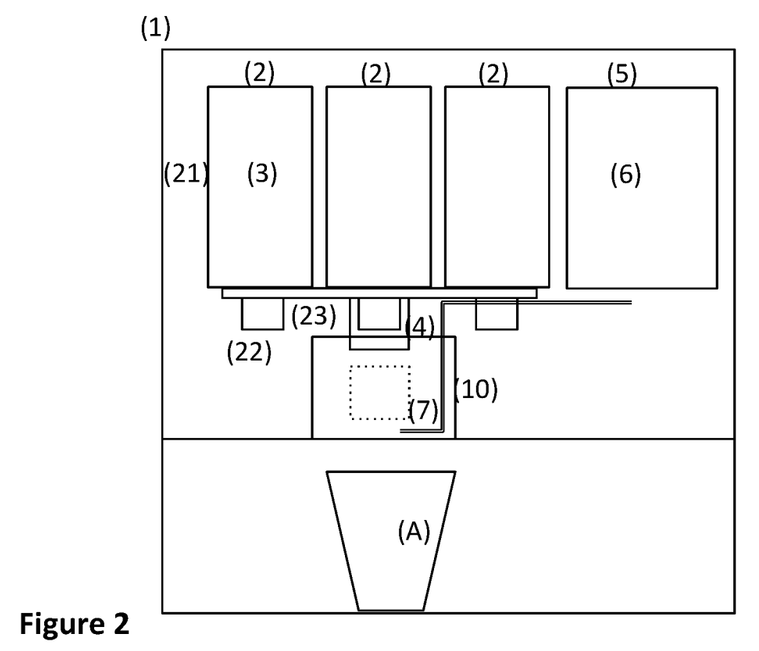
FIG. 2: front view of the first embodiment of a machine (1) for preparing beverages according to FIG. 1, at an actuated discharge position of beverage concentrate (3) into a recipient (A)

FIGS. 1 and 2 represent a first embodiment of a machine (1) for preparing beverages according to the present invention, in two different operation positions, notably in a closed position and in a discharge position, respectively.

The machine (1) for preparing beverages presents a plurality of beverage concentrate cartridges (2) comprising a recipient part (21) adapted for collecting a beverage concentrate (3), and an exit part (22) adapted for discharge of said beverage concentrate (3). Said beverage concentrate cartridges (2) are provided on a common cartridge support (23). The machine (1) for preparing beverages further comprises at least one diluent reservoir (5) adapted for collecting a beverage diluent (6), for example water, and provided in fluid connection with a liquid discharge (7) provided downstream, at a discharge zone of the machine (1) adapted for discharge of said beverage concentrate (3) and of the diluent (6) into a beverage recipient (A).

According to a preferred embodiment, each one of said beverage concentrate cartridges (2) contains a different beverage concentrate (3), that is, for example coffee of certain coffee blends, chocolate, tea or other similar substances.

Moreover, the machine (1) for preparing beverages presents a concentrate discharge device (4) adapted so that can interact with said exit part (22). In particular, said concentrate discharge device (4) is provided so that can interact with each one of said beverage concentrate cartridges (2), in such a manner that results a corresponding discharge of a preferentially previous defined quantity, of beverage concentrate (3).

It thus advantageously results that no fixed fluid connections are necessary, of a pipe type or similar, between said beverage concentrate cartridges (2) and said concentrate discharge device (4), reducing the production and maintenance costs. Moreover, it is thus possible to place different types of beverage concentrate (3) in different relative positions on the cartridge support (23) at different moments in time, given that there is no flavour contamination or other, resulting from a fixed fluid connection associated with one of said relative positions.

As one can observe, FIG. 1 shows the concentrate discharge device (4) at a first position where it does not interact with any of the beverage concentrate cartridges (2), whereas FIG. 2 schematically shows a position of interaction so as to release a discharge of a given quantity of beverage concentrate (3).

According to a preferred embodiment, said concentrate discharge device (4) is adapted so that can engage with said exit part (22) actuating the latter between a respective closed position and an open position, and vice-versa. In particular, according to an inventive aspect, said concentrate discharge device (4) is adapted so that can exert an upwards pressure upon said exit part (22), thereby actuating the latter into an open position so as to provide the discharge of a given quantity of respective beverage concentrate (3). According to another preferred embodiment, said concentrate discharge device (4) is adapted so that said beverage concentrate (3) is discharged out of a respective concentrate cartridge (2) by means of the action of the gravity force.

According to another preferred embodiment, the quantity of beverage concentrate (3) that is discharged by a beverage concentrate cartridge (2) is a function of the period of time during which said concentrate discharge device (4) drives said exit part (22) into an open position.

According to another preferred embodiment, said concentrate discharge device (4) is adapted so that said beverage concentrate (3) is discharged directly to the exterior of said machine (1) without thereby touching any material part thereof.

According to another preferred embodiment, said concentrate discharge device (4) and said diluent discharge (7) are adapted so that a flux of said beverage concentrate (3) mixes with a flux of said diluent (6) downstream of said concentrate discharge device (4), preferentially out of said machine (1). In particular, said concentrate discharge device (4) and said diluent discharge (7) are adapted so that a flux of beverage concentrate (3) mixes with a flux of diluent (6) out of said machine (1).

Figure 3:
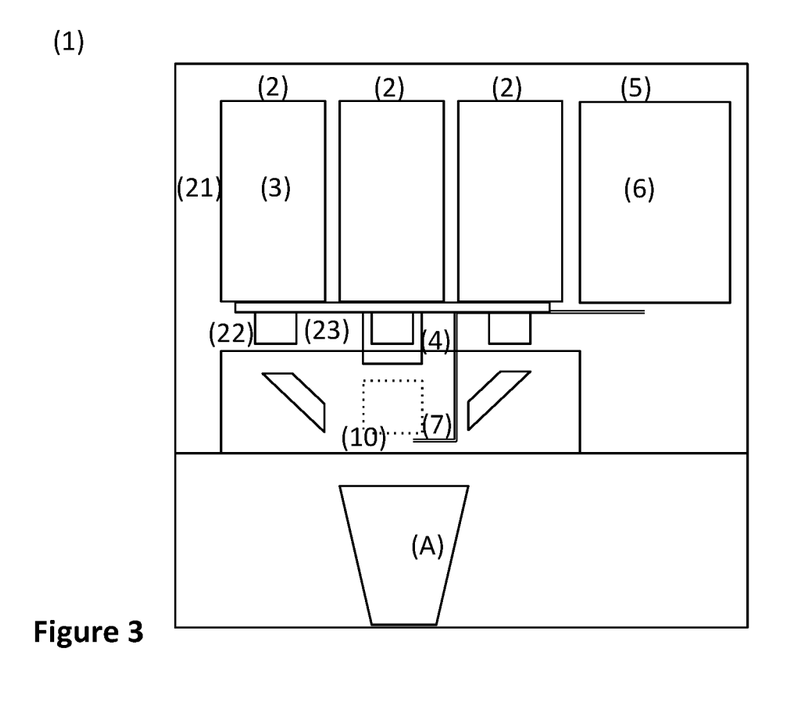
FIG. 3: front view of a second embodiment of a machine (1) for preparing beverages according to the present invention, at an actuated discharge position from a first beverage concentrate cartridge (2) into a recipient (A)
Figure 4:
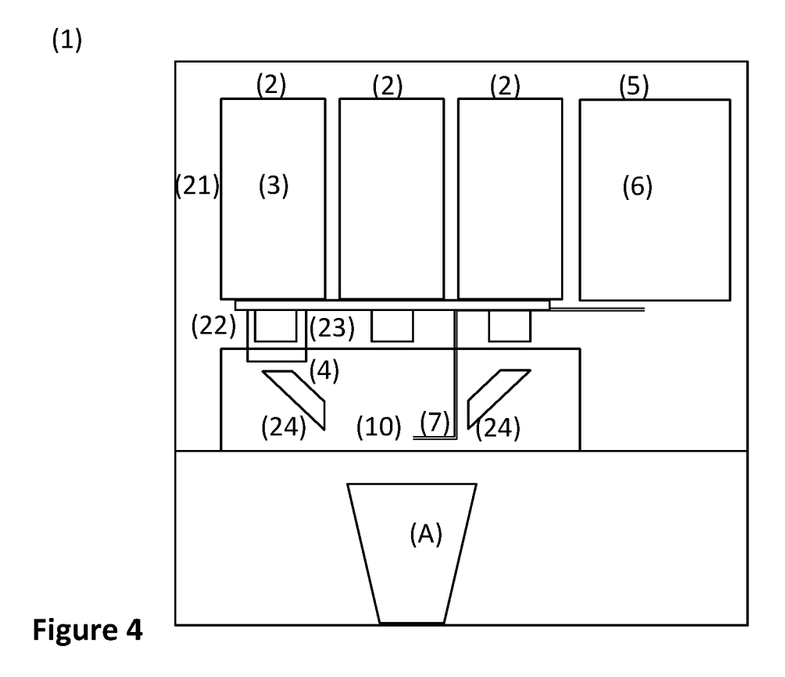
FIG. 4: front view of the embodiment of a machine (1) for preparing beverages according to FIG. 3, at an actuated discharge position of a second beverage concentrate cartridge (2) into a recipient (A).

FIGS. 3 and 4 represent a second embodiment of a machine (1) for preparing beverages according to the present invention, in two operation positions of discharge of two different beverage concentrate cartridges (2).

Each one of said beverage concentrate cartridges (2) is provided on a fixed cartridge support (23), whereas said concentrate discharge device (4) is provided mobile. In the case of this embodiment, said beverage concentrate cartridges (2) are disposed along a line, and the concentrate discharge device (4) is provided so that can be moved along two senses in a horizontal direction between each one of those, and upwards and downwards so as to interact with said exit part (22).

According to a preferred embodiment, there is further provided a discharge conduit (24) in association with each one of the discharge points associated with the interaction of said concentrate discharge device (4) with a beverage concentrate cartridge (2), so that the discharge of beverage concentrate (3) out of said machine (1) always takes place on a same discharge region, regardless of which beverage concentrate cartridge (2) is at the origin thereof.

Figure 5:
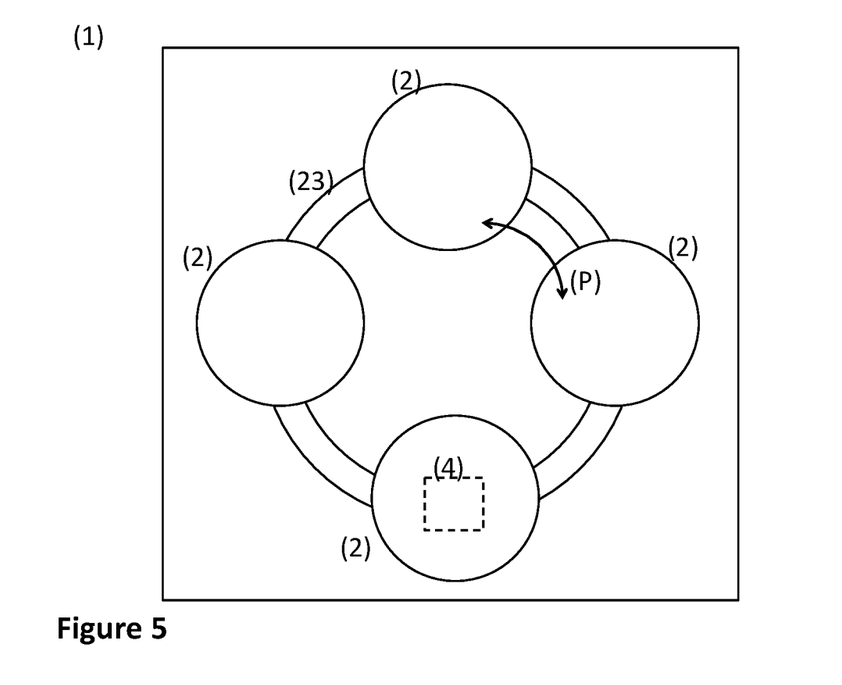
FIG. 5: top view of main functional components of a third embodiment of a machine (1) for preparing beverages according to the present invention.
Figure 6:
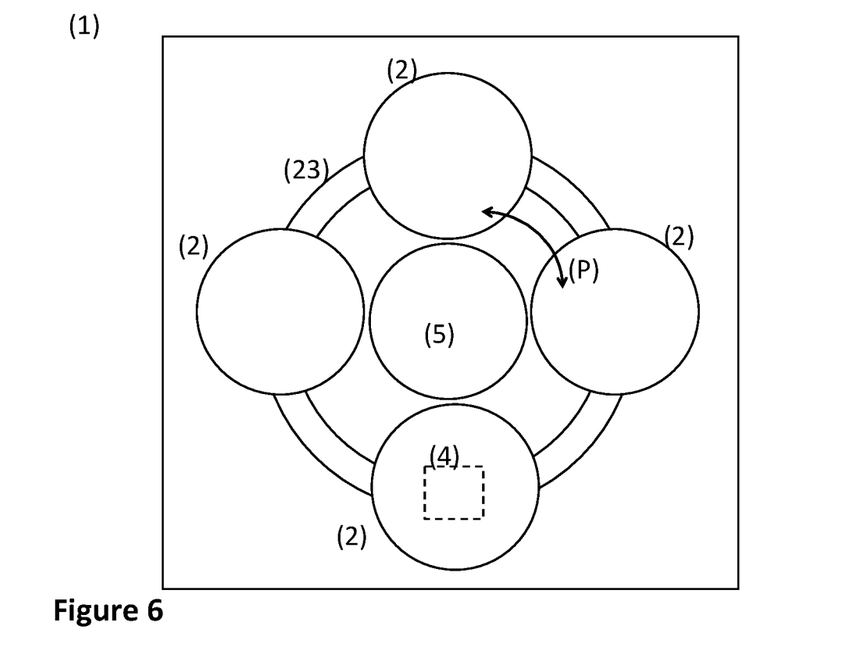
FIG. 6: top view of main functional components of a fourth embodiment of a machine (1) for preparing beverages according to the present invention.

FIGS. 5 and 6 represent top views of a third and fourth embodiments of a beverage preparation machine (1) according to the present invention.

As indicated by the arrow, said beverage concentrate cartridges (2) are in this case provided, for example on a cartridge support (23), so that can be moved relative to said concentrate discharge device (4) that is provided on a fixed position, notably on the discharge zone of said machine (1).

According to a preferred embodiment, said beverage concentrate cartridges (2) are provided on a cartridge support (23) adapted so that can be moved and thereby make said beverage concentrate cartridges (2) circulate successively by said concentrate discharge device (4), in a closed-like circuit. Moreover, it is preferred when said mobile cartridge support (23) is adapted so that can be actuated along in least one sense, preferentially along two opposing senses, in particular opposing rotation senses.

In particular, according to a particularly preferred embodiment, said beverage concentrate cartridges (2) are provided on a mobile cartridge support (23) in a carrousel-like form, or similar, so that each beverage concentrate cartridge (2) can pass along said concentrate discharge device (4).

According to another preferred embodiment, said beverage concentrate cartridges (2) present a container part (21) of cylindrical or prismatic-like form, and a discharge part (22) adapted so as to facilitate the flow of beverage concentrate (3). As represented, said beverage concentrate cartridges (2) are disposed on the cartridge support (23) with said exit part (22) oriented downwards.

In the case of FIG. 6, the diluent reservoir (5) is provided in the interior space of said carrousel-like arrangement, thereby further reducing the constructive dimension of the beverage preparation machine (1).

Figure 7:
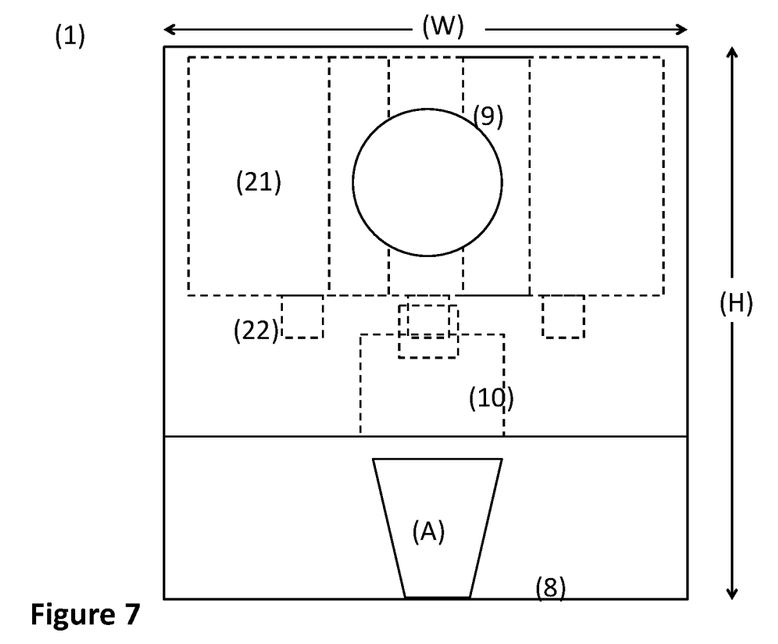
FIG. 7: front view of an embodiment of a machine (1) for preparing beverages according to FIG. 5.

FIG. 7 represents a front view of the embodiment according to FIG. 5.

The beverage preparation machine (1) presents only one zone for supporting a recipient on its front face, adapted so that can support recipients of different heights underneath the discharge zone of the service disposition (8) of said machine (1), and an actuation interface (9) adapted so as to integrate all machine actuation commands relating to the preparation of a beverage.

According to another inventive aspect, a process for preparing a beverage from at least one beverage concentrate (3) and at least one diluent (6) according to the present invention on a beverage preparation machine (1) presenting a plurality of beverage concentrate cartridges (2) and a single concentrate discharge device (4), comprises the steps: selection of a type of beverage corresponding to at least one beverage concentrate (3) de contained in one of said beverage concentrate cartridges (2), interaction of said concentrate discharge device (4) with at least one of said beverage concentrate cartridges (2), discharge of a given quantity of beverage concentrate (3) to the exterior of said machine (1), and optionally discharge of a given quantity of diluent (6) to the exterior of said machine (1).

According to a preferred embodiment, the process for preparing a given beverage includes the interaction of said concentrate discharge device (4) with at least two of said beverage concentrate cartridges (2).

Figure 8:
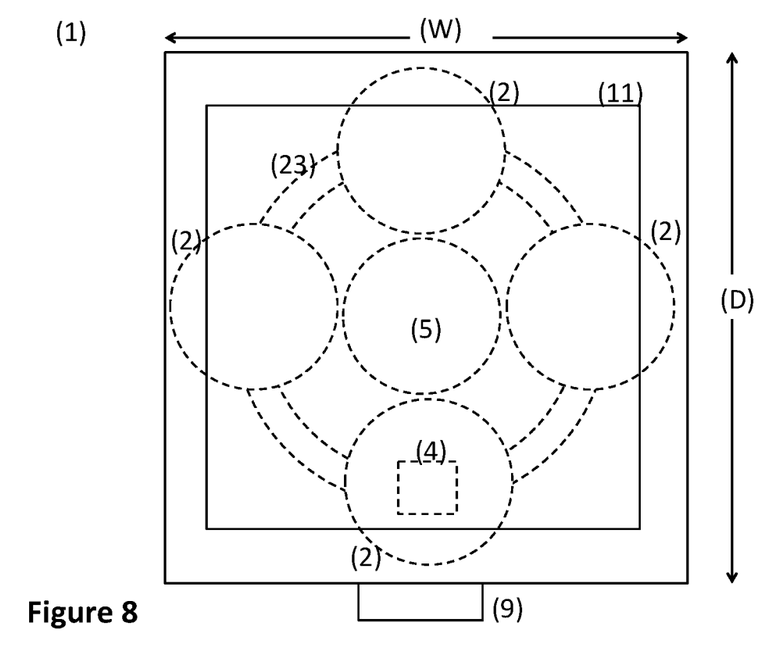
FIG. 8: perspective view of a second embodiment of a machine (1) for preparing beverages according to FIG. 5.

FIG. 8 represents a top view of a particularly preferred embodiment of the machine (1), where there is provided an access window (11) on the top face adapted so that provides access at least to all said beverage concentrate cartridges (2), preferentially also to the diluent reservoir (5). This embodiment advantageously enables an easy access by a user to said beverage concentrate cartridges (2).

Figure 9:
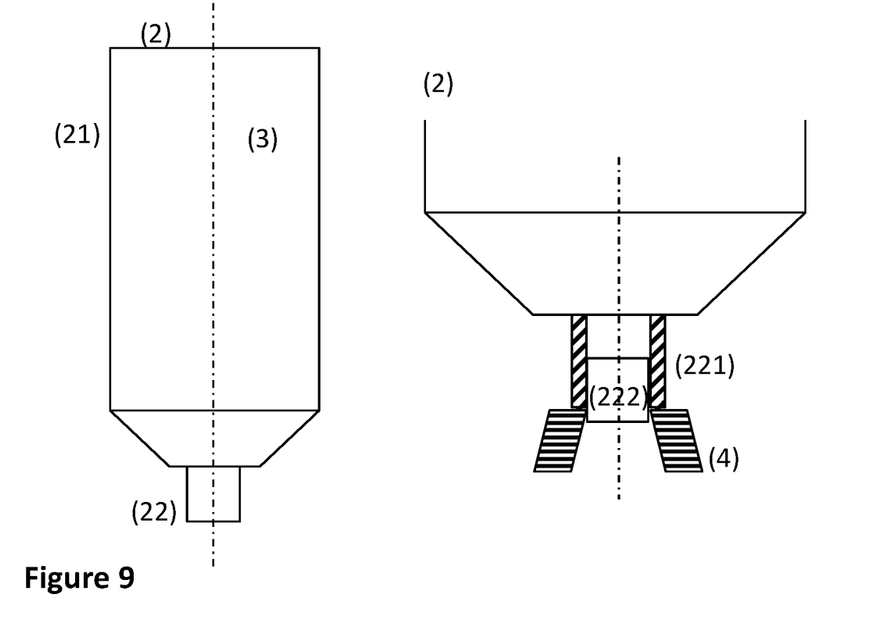
FIG. 9: side view of a beverage concentrate cartridge (2) (on the right-hand side), and detail in cut of the connection between the concentrate discharge device and the beverage concentrate cartridge (2), in a machine (1) for preparing beverages according to the invention.

FIG. 9 represents a detail of engagement of said concentrate discharge device (4) on said discharge part (22) of the beverage concentrate cartridge (2).

As represented, it is preferred when said discharge part (22) comprises an exterior part (221) and an interior part (222), and said concentrate discharge device is provided so that only actuates said exterior part (221), for example a respective base-wall, so as to displace the latter upwards relative to said interior part (222). It is herewith provided an opening and closing, and corresponding discharge of beverage concentrate (3), so that the discharge flow is discharged directly out of the do beverage concentrate cartridge (2), without the beverage concentrate (3) flowing through any physical support inside the machine (1) for preparing beverages, such as for example of the conduit type or similar.

The invention claimed is:

1. A machine (1) for preparing beverages comprising:
a plurality of beverage concentrate cartridges (2), each comprising a container part (21) adapted for containing a beverage concentrate (3) and a discharge part (22) adapted for discharge of said beverage concentrate (3) in a discharge direction, arranged in a cartridge support (23),
only one concentrate discharge device (4) adapted for interacting individually with said discharge part (22) of each of said beverage concentrate cartridges (2),
at least one stationary diluent reservoir (5) adapted for containing a beverage diluent (6) and in fixed fluid connection with a diluent discharge (7) provided downstream of said diluent reservoir,
a control device provided in operational connection with said concentrate discharge device (4),
wherein said beverage concentrate cartridges (2) are stationary and said concentrate discharge device (4) is moveable, and both are provided so that said beverage concentrate cartridges and said discharge device can be vertically aligned in a position where said concentrate discharge device (4) is underneath said discharge part (22) of a beverage concentrate cartridge (2),
wherein both said concentrate discharge device (4) and said diluent discharge (7) are coupled to a discharge zone of the machine (1), and
wherein said concentrate discharge device (4) is movable so that said concentrate discharge device (4) can interact with a selected one of said beverage concentrate cartridges (2) by means of a forward and back movement of said concentrate discharge device (4), and is moveable in a direction that is parallel to the discharge direction, so as to actuate a respective opening and closure of said discharge part (22) and thereby provide discharge of said beverage concentrate (3) to said discharge zone, but is not moveable to said diluent reservoir.

2. The machine (1) according to claim 1, wherein said concentrate discharge device (4) is adapted so that can be actuated to exert an upwards pressure upon an exterior part (221) of said discharge part (22), thereby displacing said exterior part (221) by a given displacement extension relative to an interior part (222) of said discharge part (22), from a closed position to an open position where, during a given period of time, the discharge part (22) provides flow passage to beverage concentrate (3) out of a respective beverage concentrate cartridge (2) by means of gravity force action, and that can stop exerting said upwards pressure so that said discharge part (22) returns to said closed position.

3. The machine (1) according to claim 2, wherein displacing said exterior part (221) is against the contrary action of elastic means provided on said discharge part (22) and said discharge part (22) returns to said closed position driven by elastic means provided on said discharge part (22).

4. The machine (1) according to claim 1, wherein said concentrate discharge device (4) is provided in operational connection with said control device, so that there is provided a regulation of the duration of the period of time during which said concentrate discharge device (4) actuates said discharge part (22) into an open position, thereby regulating the quantity of beverage concentrate (3) discharged by a beverage concentrate cartridge (2) in each actuation of said discharge part (22).

5. The machine (1) according to claim 1, wherein said concentrate discharge device (4) is provided in operational connection with said control device so that there is provided a regulation of the upwards displacement extension of said discharge part (22), thereby regulating the quantity of beverage concentrate (3) discharged by a beverage concentrate cartridge (2) in each actuation of said discharge part (22).

6. The machine (1) according to claim 1, wherein said concentrate discharge device (4) is provided so at to engage with a sidewall region of said discharge part (22), or with a base-wall region of said discharge part, that surrounds a discharge flow passageway of beverage concentrate (3) out of a respective beverage concentrate cartridge (2).

7. The machine (1) according to claim 1, wherein said concentrate discharge device (4) is provided mobile along a generally horizontal plane so that can interact with each one of said beverage concentrate cartridges (2) that are provided fixed.

8. The machine (1) according to claim 1, wherein each one of said beverage concentrate cartridges (2) is provided on a fixed cartridge support (23), whereby there is provided a discharge conduit (24) associated to each of the discharge parts associated with the interaction of said concentrate discharge device (4) with a beverage concentrate cartridge (2).

9. A machine (1) for preparing beverages comprising:
a plurality of beverage concentrate cartridges (2), each comprising a container part (21) adapted for containing a beverage concentrate (3) and a discharge part (22) adapted for discharge of said beverage concentrate (3) in a discharge direction, arranged in a cartridge support (23), said beverage concentrate cartridges (2) being provided on a mobile cartridge support (23),
a stationary concentrate discharge device (4) adapted for interacting individually with said discharge part (22) of each of said beverage concentrate cartridges (2),
at least one stationary diluent reservoir (5) adapted for containing a beverage diluent (6) and in fixed fluid connection with a diluent discharge (7) provided downstream of said diluent reservoir,
a control device provided in operational connection with said concentrate discharge device (4) and said mobile carrier support (23),
wherein said beverage concentrate cartridges (2) and said concentrate discharge device (4) are provided so that said beverage concentrate cartridges and said discharge device can be vertically aligned in a position where said concentrate discharge device (4) is underneath said discharge part (22) of a beverage concentrate cartridge (2),
wherein both said concentrate discharge device (4) and said diluent discharge (7) are coupled to a discharge zone of the machine (1),
wherein said mobile carrier support (23) is movable so that said concentrate discharge device (4) can interact with a selected one of said beverage concentrate cartridges (2) by means of a movement of said mobile carrier support (23), and said discharge device is moveable in a direction that is parallel to the discharge direction, so as to actuate a respective opening and closure of said discharge part (22) and thereby provide discharge of said beverage concentrate (3) to said discharge zone, and
wherein said beverage concentrate cartridges (2), but not said diluent reservoir, can be actuated into movement along two directions, relative to said concentrate discharge device (4) that is provided on a stationary position that is vertically aligned above said discharge zone.

10. The machine (1) according to claim 9, wherein said beverage concentrate cartridges (2) are moveable by rotation along two opposing rotation directions, relative to said concentrate discharge device (4).

11. The machine (1) according claim 1, wherein said beverage concentrate cartridges (2) present a container part (21) of cylindrical or prismatic form, and a discharge part (22) disposed on the downwards-oriented face thereof, and adapted so as to engage in removable manner with a perimeter region of said concentrate discharge device (4).

12. The machine (1) according to claim 1, further comprising a fluid compression device, and a fluid heating device, whereby these devices are arranged on each side of said cartridge support (23).

13. The machine (1) according to claim 1, wherein said diluent reservoir (5) presents a volume that is bigger than the volume of any of said beverage concentrate cartridges (2), and is provided at a central region of an arrangement of said beverage concentrate cartridges (2), and
wherein a width (W) of the machine (1) is smaller than the total width corresponding to the sum of the individual width of all of said beverage concentrate cartridges (2).

14. The machine (1) according to claim 13, wherein the width (W) of the machine (1) is smaller than two thirds of the total width of said beverage concentrate cartridges (2).

15. The machine (1) according to claim 1, wherein said machine presents an access window (8) provided on a top face and providing simultaneous access to said beverage concentrate cartridges (2) and said diluent reservoir (5).

16. The machine (1) according to claim 1, wherein the front part of the machine (1) includes a service disposition (8) comprising a discharge zone (10) for beverage concentrate (3) and beverage diluent (6), and adapted for support of at least one beverage recipient (A).

17. The machine (1) according to claim 1, wherein the front part of the machine (1) further presents a user interface (9) adapted for providing a graphic representation of beverage concentrate in the beverage concentrate cartridge (2) that is in operation position and of the level of beverage diluent (6) that is in the diluent reservoir (5).

18. The machine (1) according to claim 17, wherein user interface (9) is adapted for providing a graphic representation of the level of concentrate that is in each beverage concentrate cartridge (2).

19. The machine (1) according to claim 10, wherein said cartridges are moveable by a carrousel type structure.

* * * * *